(12) United States Patent
Loh et al.

(10) Patent No.: US 9,026,731 B2
(45) Date of Patent: May 5, 2015

(54) MEMORY SCHEDULING FOR RAM CACHES BASED ON TAG CACHING

(71) Applicant: Advanced Micro Devices, Inc., Sunnyvale, CA (US)

(72) Inventors: Gabriel Loh, Bellevue, WA (US); Jaewoong Sim, Atlanta, GA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 214 days.

(21) Appl. No.: 13/725,024

(22) Filed: Dec. 21, 2012

(65) Prior Publication Data

US 2014/0181384 A1    Jun. 26, 2014

(51) Int. Cl.
*G06F 12/08* (2006.01)
*G06F 12/00* (2006.01)

(52) U.S. Cl.
CPC ............ *G06F 12/00* (2013.01); *G06F 12/0846* (2013.01); *G06F 12/0888* (2013.01)

(58) Field of Classification Search
CPC ............ G06F 12/0811; G06F 12/0815; G06F 12/0888; G06F 12/0846
USPC .................................................. 711/122, 118
See application file for complete search history.

(56) References Cited

U.S. PATENT DOCUMENTS

| 6,070,227 | A  | * | 5/2000 | Rokicki ......................... 711/117 |
| 6,189,068 | B1 | * | 2/2001 | Witt et al. ......................... 711/3 |
| 2001/0007538 | A1 | * | 7/2001 | Leung ........................... 365/222 |

OTHER PUBLICATIONS

Loh, G. H., et al., "Efficiently Enabling Conventional Block Sizes for Very Large Die-stacked DRAM Caches," *MICRO* 11, The Association for Computing Machinery, Inc., United States (2011).

* cited by examiner

*Primary Examiner* — Than Nguyen
(74) *Attorney, Agent, or Firm* — Volpe and Koenig, P.C.

(57) ABSTRACT

A system, method and computer program product to store tag blocks in a tag buffer in order to provide early row-buffer miss detection, early page closing, and reductions in tag block transfers. A system comprises a tag buffer, a request buffer, and a memory controller. The request buffer stores a memory request having an associated tag. The memory controller compares the associated tag to a plurality of tags stored in the tag buffer and issues the memory request stored in the request buffer to either a memory cache or a main memory based on the comparison.

18 Claims, 5 Drawing Sheets

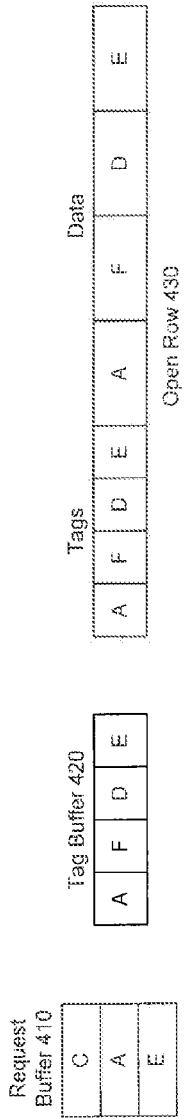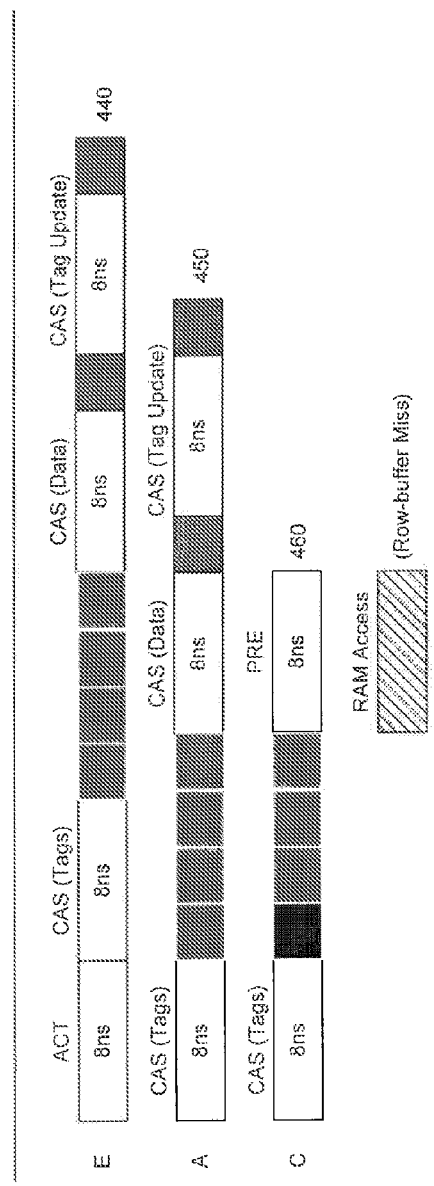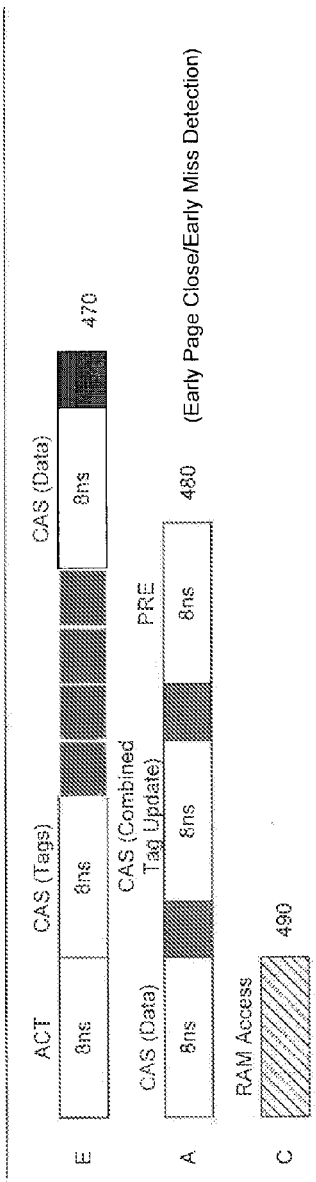
FIG. 4A
FIG. 4B

MEMORY SCHEDULING FOR RAM CACHES BASED ON TAG CACHING

BACKGROUND

1. Field

The present disclosure is generally directed to memory scheduling. More particularly, the present disclosure is directed to memory scheduling for RAM caches based on tag caching.

2. Background Art

Memory performance has become increasingly important to overall system performance. As a result, there is an increased need to carefully schedule memory operations. This is particularly important with respect to a Random Access Memory (RAM) cache.

A RAM cache operates like a conventional cache. Specifically, a RAM cache stores copies of data from a plurality of memory locations in main memory. Memory requests are issued to the RAM cache first. If there is a cache hit, the requested data is returned from the RAM cache. Otherwise, the request is sent to main memory.

A RAM cache may be implemented with a memory technology that employs row-buffers. Memory technologies employing row-buffers may include, but are not limited to, dynamic random access memory (DRAM), embedded dynamic random access memory (eDRAM), phase change memory (PCM), and the like. Specifically, a RAM cache is typically split into multiple equal-sized units called banks, with each bank having a row-buffer. Each bank is organized as a plurality of rows. Each row contains data blocks and corresponding tag blocks. The tag blocks are used to locate the data blocks in the row.

Before reading or writing a memory location, the row containing that memory location is read into the bank's row-buffer. This is called opening the row. The requested memory location is then read from or written to the row-buffer. The opened row is stored in the row-buffer until it is explicitly closed.

In such an architecture, if there is a request to a memory location in an open row, the memory location can be serviced immediately from the row-buffer. This is called a row-buffer hit. If, however, the request is to a memory location not in an open row, the row-buffer must be closed and the row containing that memory location must be read into the row-buffer. The request is then serviced from the row-buffer. This is called a row-buffer conflict and it results in a memory stall.

Given the performance advantage of issuing requests that hit a row-buffer, conventional memory scheduling often uses row-buffer locality aware algorithms, such as FR-FCFS (first-ready, first-come first serve) to reduce row open/close penalties. For example, in the FR-FCFS algorithm, memory requests that would hit in a row-buffer are given priority. In addition to minimizing row open/close penalties, the cost of servicing memory requests from main memory is reduced.

Even with row-buffer locality aware algorithms, however, a RAM cache may suffer from inefficiencies. First, data requested from the RAM cache may not be present therein. As a result, there may be unnecessary lookups in the RAM cache. Second, even if a request hits in the RAM cache, locating a data block in the RAM cache is often expensive. Specifically, in order to locate a data block, all the tag blocks in the row must be read. This is very costly. Finally, consecutive memory addresses are often not mapped to the same row in the same bank due to the cache block size and typical address indexing schemes of RAM caches. As a result, the number of requests that fall in the same open row in the RAM cache is typically small.

SUMMARY

What is therefore needed is a mechanism to efficiently service memory requests, which provides, e.g., early row-buffer miss detection, early row-buffer closing, and reductions in tag block transfers for a RAM cache.

Embodiments, under certain circumstances, include a method for comparing a memory request having an associated tag to a plurality of tags stored in a tag buffer and issuing the memory request to either a memory cache or main memory based on the comparing. The method allows row-buffer misses to be detected early, facilities early page closing, and reduces the number of tag block transfers. It also makes an open page policy a more viable option for use with a RAM cache. As a result, memory requests to a RAM cache can be serviced more efficiently, which improves system performance and reduces power consumption.

Further features and advantages of the embodiments, as well as the structure and operation of the embodiments, are described in detail below with reference to the accompanying drawings. It is noted that the embodiments are not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the embodiments and to enable a person of ordinary skill in the relevant art to make and use the invention.

FIG. 4A is an illustration of the performance characteristics of memory scheduling without tag caching.

FIG. 4B is an illustration of the performance characteristics of memory scheduling with tag caching, according to an embodiment.

DETAILED DESCRIPTION

An embodiment provides a tag buffer, a request buffer configured to store a memory request having an associated tag, and a memory controller configured to compare the associated tag to a plurality of tags stored in the tag buffer, and issue the memory request stored in the request buffer to either a RAM cache or a main memory based on the comparison. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the embodiments, and well-known elements of the embodiments may not be described in detail or may be omitted so as not to obscure the relevant details of the embodiments. In addition, the terminology used herein is for the purpose of describing particular embodiments only and is not intended to be limiting of the embodiments. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
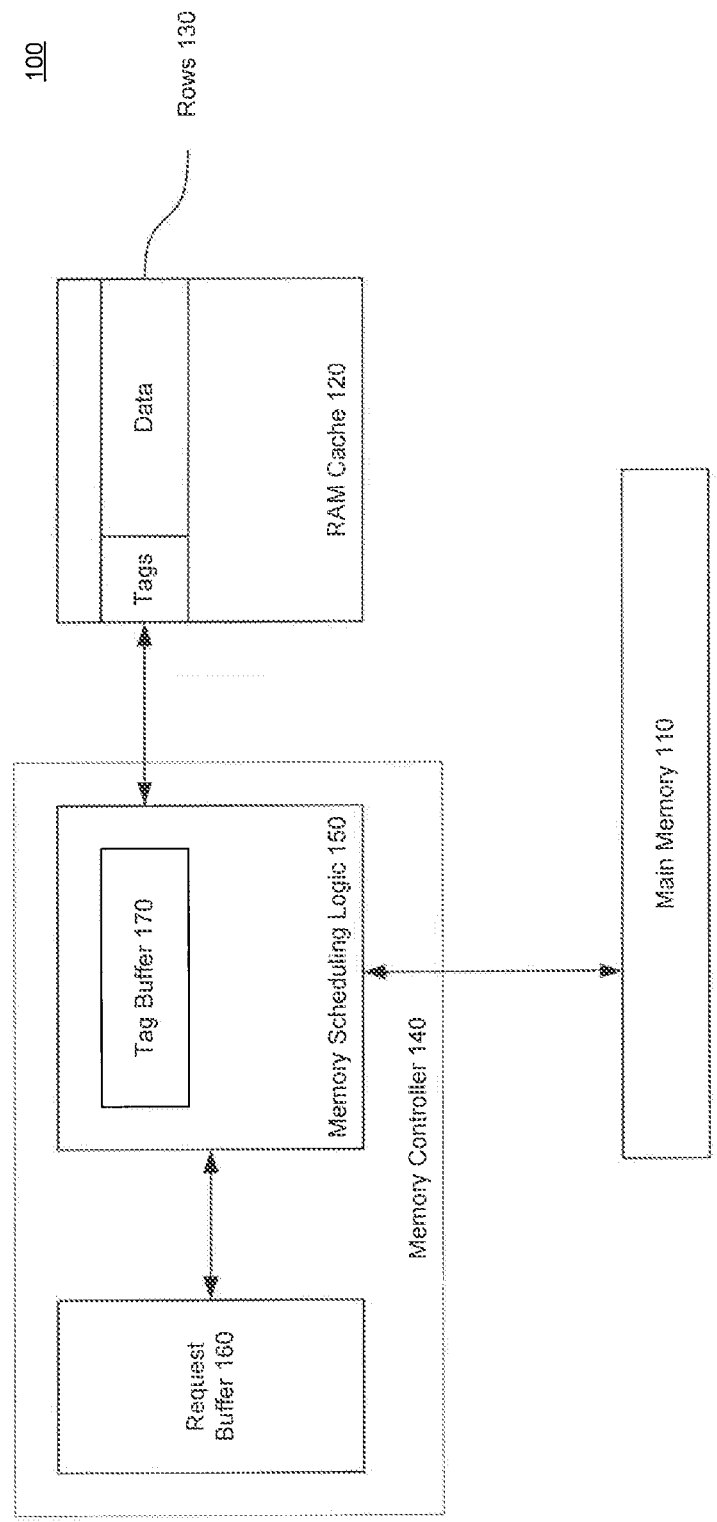
FIG. 1 is an illustration of a memory system constructed and arranged according to an embodiment.

FIG. 1 is a block diagram illustration of a memory system 100, according to an embodiment. In the example shown in FIG. 1, memory system 100 includes a main memory 110, a RAM cache 120, and a memory controller 140. Main memory 110 may service memory requests stored in request buffer 160 and issued by memory scheduling logic 150. Main memory 110 is any type of memory technology. Main memory 110 can be defined as a higher level in the memory hierarchy relative to RAM cache 120. For example, if RAM cache 120 is the L2 cache, main memory 110 could be the L3 cache or the system RAM.

RAM cache 120 is a memory cache for main memory 110. RAM cache 120 may be located outside of the processor die. Specifically, RAM cache 120 stores copies of data from a plurality of memory locations in main memory 110. RAM cache 120 may service memory requests stored in request buffer 160 and issued by memory scheduling logic 150. If there will be a cache hit, the requested data is returned from RAM cache 120. Otherwise, the request is sent to main memory 110.

RAM cache 120 is a row-based memory. In other words, RAM cache 120 is any type of memory technology that employs row-buffers. For example, RAM cache 120 may be, but is not limited to, Dynamic RAM (DRAM), embedded DRAM (eDRAM), phase-change memory (PCM), spin-torque-transfer magneto-resistive RAM (STT-MRAM) or resistive RAM (RRAM).

RAM cache 120 is split into one or more equal-sized units called banks. Each memory bank stores a plurality of rows 130, and each row 130 contains data blocks and corresponding tag blocks. The tag blocks are used to locate the data blocks in row 130.

Each memory bank also has a row-buffer. Before a data block in RAM cache 120 can be accessed, the row 130 containing that data block is opened and read into the bank's row-buffer. The row 130 is stored in the row-buffer until it is explicitly closed. The requested data block may then be read from the row-buffer.

If there is a memory request for a data block in an open row, it can be serviced immediately from the corresponding row-buffer. This is called a row-buffer hit. If, however, the request is to a data block that is not in an open row, the row in the corresponding bank is closed and the row containing that memory location is read into the bank's row-buffer. The data block is then read from the row-buffer. This is called a row-buffer conflict.

In one example, RAM cache 120 implements either an open page policy or closed page policy. In an open page policy, the row in the row-buffer is kept open after every memory request. In contrast, in a closed page policy, the row in the row-buffer is closed after every memory request. In the embodiments disclosed herein, an open page policy is presumed. A person of ordinary skill in the art, however, would appreciate that the disclosed embodiments may be implemented with a closed page policy.

A person of skill in the art will understand that RAM cache 120 can be implemented using software, firmware, hardware, or any combination thereof. In one embodiment, some or all of the functionality of RAM cache 120 is specified in a hardware description language, such as Verilog, RTL, netlists, etc. to enable ultimately configuring a manufacturing process through the generation of maskworks/photomasks to generate a hardware device embodying aspects described herein.

In one example, memory controller 140 includes memory scheduling logic 150 and request buffer 160. Request buffer 160 stores memory requests that are to be issued. Each memory request has an associated tag. In an embodiment, the memory requests in request buffer 160 are grouped by the row they reside in.

In one example, memory scheduling logic 150 issues memory requests from request buffer 160 to either RAM cache 120 or main memory 110. Memory scheduling logic 150 issues the requests according to a scheduling policy. For example, memory scheduling logic 150 may utilize a FR-FCFS (first-ready, first-come first serve) scheduling policy with open paging. In the FR-FCFS scheduling policy, memory requests that would hit open rows are given priority over requests that do not hit open rows. In the embodiments disclosed herein, FR-FCFS scheduling is presumed. A person of ordinary skill in the art, however, would appreciate that alternate scheduling policies may be utilized.

In one example, memory scheduling logic 150 includes a tag buffer 170. Tag buffer 170 can be high speed cache memory. Tag buffer 170 can store copies of the tag blocks in rows 130.

In one example, memory scheduling logic 150 determines a memory request's associated row. In the embodiments disclosed herein, memory scheduling logic 150 calculates a row index from the memory request's address. The row index, together with the presence of tags that are mapped to the associated row and stored in tag buffer 170, determines whether the associated row is present in tag buffer 170. If the row is present, then it can be determined whether the memory request will hit or miss RAM cache 120. If the row is not present, then it cannot be determined whether issuing the memory request to RAM cache 120 will result in a hit or miss.

If the row is present in tag buffer 170, memory scheduling logic 150 is able to determine whether the memory request will result in a RAM cache hit or miss. Specifically, the memory request's associated tag is compared to the row's tags that are stored in tag buffer 170. If the memory request's associated tag is present in tag buffer 170, then there will be a RAM cache hit. The data block can, therefore, be retrieved from RAM cache 120. If the memory request's associated tag is not present in tag buffer 170, then there will be a RAM cache miss. The request will, therefore, need to be issued to main memory 110.

For example, assume data blocks A, B, C, D, E, F, G and H map to row 412 in RAM cache 120. Row 412 may only contain copies of blocks A, B, D and F. Similarly, tag buffer 170 may contain copies of tag blocks A, B, D and F. If there is a memory request for blocks A, B, D and F, tag buffer 170 will indicate that there will be a RAM cache hit. If, however, there is a memory request for blocks C, E, G or H, tag buffer 170 will indicate that there will be a RAM cache miss.

In this example, tag buffer 170 allows memory scheduling logic 150 to preemptively determine if there will be a RAM cache 120 hit or miss and where to issue a memory request. In other words, memory scheduling logic 150 coupled with tag buffer 170 can provide early miss detection and determine when a memory request is the last request to hit a row 130 in RAM cache 120.

In an example when memory scheduling logic 150 determines that a memory request is the last request to hit a row 130, the tags in row 130 are updated based on the corresponding tags stored in tag buffer 170. This one-time combined tag update reduces tag update costs. In addition, a command may be sent to RAM cache 120 to close the corresponding row stored in the row-buffer. Because the next memory request's associated tag is not in tag buffer 170, the next request can be issued directly to main memory 110. In other words, the current and subsequent memory requests can be overlapped in time and the opened row in RAM cache 120 can be closed early.

A person of skill in the art will understand that memory scheduling logic 150 can be implemented using software, firmware, hardware, or any combination thereof. In one embodiment, some or all of the functionality of memory scheduling logic 150 is specified in a hardware description language, such as Verilog, RTL, netlists, etc. to enable ultimately configuring a manufacturing process through the generation of maskworks/photomasks to generate a hardware device embodying aspects described herein.

Figure 2:
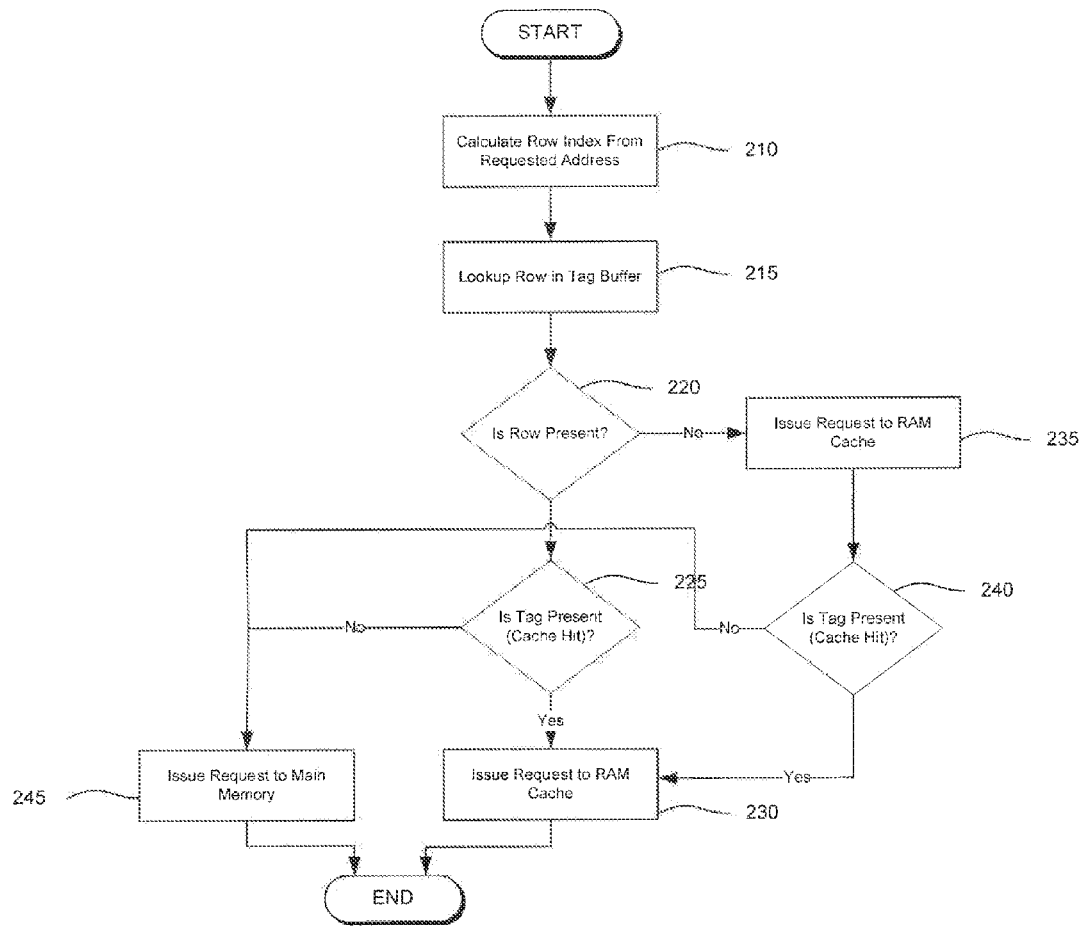
FIG. 2 is a flowchart of an illustrative method for performing tag lookups, according to an embodiment.

FIG. 2 is a flowchart of an exemplary method 200 illustrating the sequence of operations performed for tag lookups, and to issue memory requests to either a RAM cache or main memory based on tag caching, according to an embodiment. Flowchart 200 includes operations 210 through 245. It is to be appreciated that not all steps may be required, nor performed in the order described.

In operation 210, a first memory request in the request buffer is retrieved. In one example, memory requests in a request buffer may be grouped together according to a memory scheduling policy. For example, a FR-FCFS memory scheduling policy groups memory requests based on whether they would fall into a same row. The row index associated with the memory request's address is then calculated.

In operation 215, a lookup in the tag buffer is performed for the row associated with the memory request. In one example, the row index may be used to perform the lookup.

In operation 220, if the row is present in the tag buffer, operation 225 is performed. If the row is not present in the tag buffer, operation 235 is performed. A row is present in the tag buffer if one or more tags associated with the row are present in the tag buffer.

In operation 225, if the memory request's associated tag is present in the tag buffer, then the memory request's corresponding data block is present in the RAM cache. In other words, issuing the memory request to the RAM cache will result in a cache hit. Accordingly, operation 230 is performed and the memory request is issued to the RAM cache.

However, if the memory request's associated tag is not present in the tag buffer, then the memory request's corresponding data block is not present in the RAM cache. In other words, issuing the memory request to the RAM cache will result in a cache miss. Accordingly, operation 245 is performed and the memory request is issued to the main memory.

In operation 235, the row associated with the memory request was not present in the tag buffer. Therefore, it cannot be determined whether the memory request's data block is in the RAM cache. Accordingly, the memory request is first sent to the RAM cache for possible fulfillment.

In operation 240, if the memory request's associated tag is present in the RAM cache, then there will be a RAM cache hit. Accordingly, operation 230 is performed and the memory request is issued to the RAM cache.

If, however, the memory request's associated tag is not present in the RAM cache, then there will be a RAM cache miss. Accordingly, operation 245 is performed and the memory request is issued to the main memory.

Figure 3:
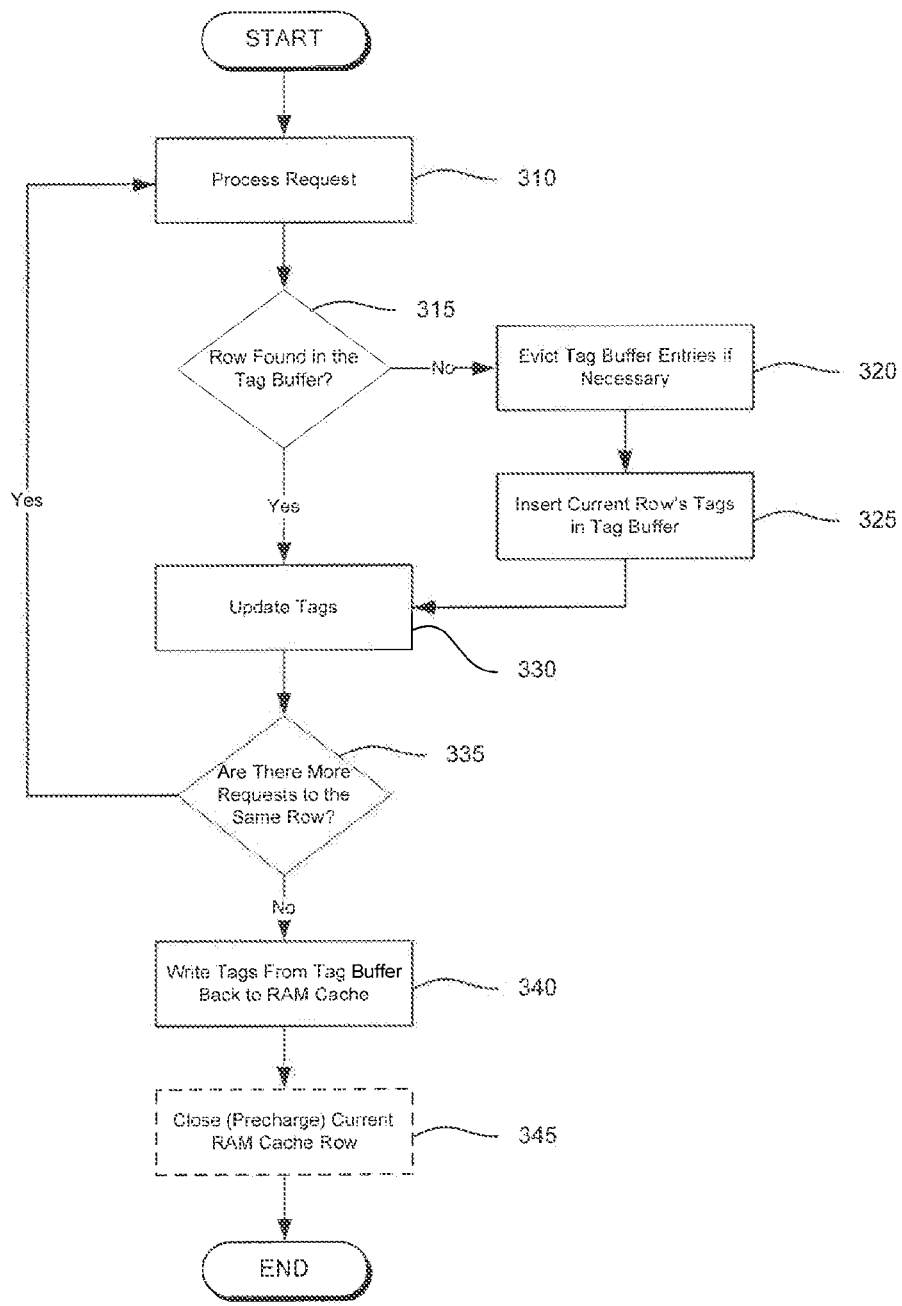
FIG. 3 is a flowchart of an illustrative method for performing tag updates, according to an embodiment.

FIG. 3 is a flowchart of an exemplary method 300 for performing tag updates, according to an embodiment. The operations in flowchart 300 are performed after the operations in flowchart 200. Flowchart 300 includes operations 310 through 345. It is to be appreciated that not all steps may be required, nor performed in the order described.

In operation 310, the memory request is processed as discussed in FIG. 2.

In operation 315, if the row associated with the memory request is present in the tag buffer, operation 330 is performed. If, however, the row was not present in the tag buffer, operation 320 is performed.

In operation 320, it is determined whether entries in the tag buffer need to be evicted. In one example, if there are no entries in the tag buffer that are invalid or unused, then one or more entries are evicted.

In operation 325, the tags of the row associated with the memory request are copied into the tag buffer. This facilitates efficient processing of subsequent memory requests that are associated with the same row.

In operation 330, the tags in the tag buffer are updated.

In operation 335, it determined whether there are more memory requests to the same row. If there are more requests to the same row, then operation 310 is performed. If, however, there are no more requests to the same row, then operation 340 is performed.

The determination of whether there are more memory requests to the same row may be simplified based on the chosen memory scheduling policy. For example, where memory scheduling logic 150 utilizes a FR-FCFS (first-ready, first-come first serve) scheduling policy with open paging, memory requests that would hit open rows are given priority over requests that do not hit open rows. As a result, memory requests are grouped according to row.

In operation 340, the row's tags that are stored in the tag buffer are written back to the RAM cache. In other words, after issuing the last memory request to hit the row in the RAM cache, the row's tags in the RAM cache are updated with the tags of the same row that are stored in the tag buffer. This combined tag update is faster than the conventional individual tag updates.

In operation 345, the current RAM cache row is optionally closed. This is because the last memory request has hit the RAM cache. As a result, the row in the RAM cache can be closed early.

By implementing a tag buffer with a RAM cache for memory scheduling, memory requests can be handled more efficiently. Specifically, tag lookups can performed more quickly and tags in the RAM cache are only updated after the last memory request to hit the RAM cache is issued. In addition, unnecessary RAM cache accesses that would result in a miss are avoided through early miss detection. Finally, tag caching enables row-buffers to be closed earlier.

FIGS. 4A and 4B illustrate the performance characteristics of memory scheduling with and without tag caching. The illustrations are discussed with reference to the use of a FR-FCFS memory scheduling policy. However, as would be appreciated by a person of ordinary skill in the art, other memory scheduling policies may be used. The illustrations also presume open paging policies in which a page is kept open after every memory access. However, as would be appreciated by a person of ordinary skill in the art, a closed paging policy may also be used.

In the example shown in both figures, request buffer 410 stores the memory requests to be issued. The memory requests are processed in the order listed, e.g. E, A and C. The memory requests all index into the same row of the RAM cache. Tag buffer 420 contains tag blocks stored in the RAM cache. Row 430 is a row in the RAM cache that stores the data and tags blocks. In row 430, each data block has an associated tag block.

As noted above, FIG. 4A illustrates the performance characteristics of memory scheduling without tag caching. Memory request E represents the first memory request to be issued. In step 440, an Activation (ACT) command is sent to the RAM cache, which opens row 430 containing the requested data block in a row-buffer.

A Column Address Strobe (CAS) command is then issued to read the tag blocks from row 430 in the RAM cache. The four tags are read and compared to the memory request's associated tag, e.g., E. Since E is in the read tags, a CAS command is issued to read the data block associated with tag E. The corresponding data block is then read. Finally, the memory request's associated tag, e.g. E, is updated in row 430 of the RAM cache.

In step 450, memory request A is processed. Since row 430 is already open, no ACT command is issued. Rather, a CAS command is issued to read the tag blocks from row 430 in the RAM cache. The four tags are read and compared to the memory request's associated tag, e.g., A. Since A is in the read tags, a CAS command is issued to read the data block associated with tag A. The corresponding data block is then read. Finally, the memory request's associated tag, e.g., A, is updated in row 430 of the RAM cache.

In step 460, memory request C is processed. Because the row is already open, no ACT command is issued. A CAS command is issued to read the tag blocks from row 430 in the RAM cache. The four tags are read and compared to the memory request's associated tag, e.g., C. In this example, since C is not in the read tags, the data block associated with C is not in row 430 of the RAM cache. The memory request is, therefore, serviced from main memory. Row 430 may also be closed in the row-buffer. If the row is closed, a Precharge (PRE) command is issued to close the row-buffer.

In contrast, the use of tag caching with RAM caching greatly improves performance. FIG. 4B illustrates the performance characteristics of memory scheduling with tag caching. Memory request E represents the first memory request to be issued.

In step 470, an ACT command is sent to the RAM cache which opens the row containing the requested data block in a row-buffer. A CAS command is then issued to read the tag blocks from the RAM cache. The four tags are read and stored in tag buffer 420 as shown. The memory request's associated tag, e.g., E, is then compared to the tags stored in the tag buffer. Since E is in tag buffer 420, a CAS command is issued to read the data block associated with tag E. The corresponding data block is then read. Since the tags are cached in tag buffer 420, and the row-buffer does not need to be closed, no tag update is required as in 440.

In step 480, memory request A is processed. Since the row-buffer is open, no ACT command is issued. Rather, the tags in tag buffer 420 are compared to the memory request's tag, e.g., A. Unlike in step 450, a CAS command may not be issued, nor will a delay be incurred to read the tags from row 430 of the RAM cache. Since the memory request's tag, e.g., A, is in tag buffer 420, a CAS command can be issued immediately to read the data block associated with memory request A from open row 430. The data block is then read.

In one example, an associated tag of a next memory request, e.g., C, is then compared to the tags stored in tag buffer 420. Since C may not be in tag buffer 420, memory request A is the last request that hits open row 430 of the RAM cache. Therefore, a CAS command can be issued that performs a combined tag update of open row 430 based on the tags stored in tag buffer 420. In this example, because the CAS command is a combined tag update, the extra tag update in step 440 is eliminated.

In one example, since memory request A represents the last request to hit open row 430 of the RAM cache, a PRE command can be immediately issued to close the row-buffer in the RAM cache. In addition, memory request C can be issued immediately (step 490). This is in contrast to step 460 where the tags have to be read from the RAM cache in order to determine whether C is in the RAM cache, as well as before any PRE command is issued to close the row-buffer.

As a result, tag caching eliminates unnecessary tag reads and updates and facilitates early miss detection and page closing. These benefits translate into significant performance improvements. In addition, because several scheduling operations can be eliminated, power savings can be noticed.

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 5:
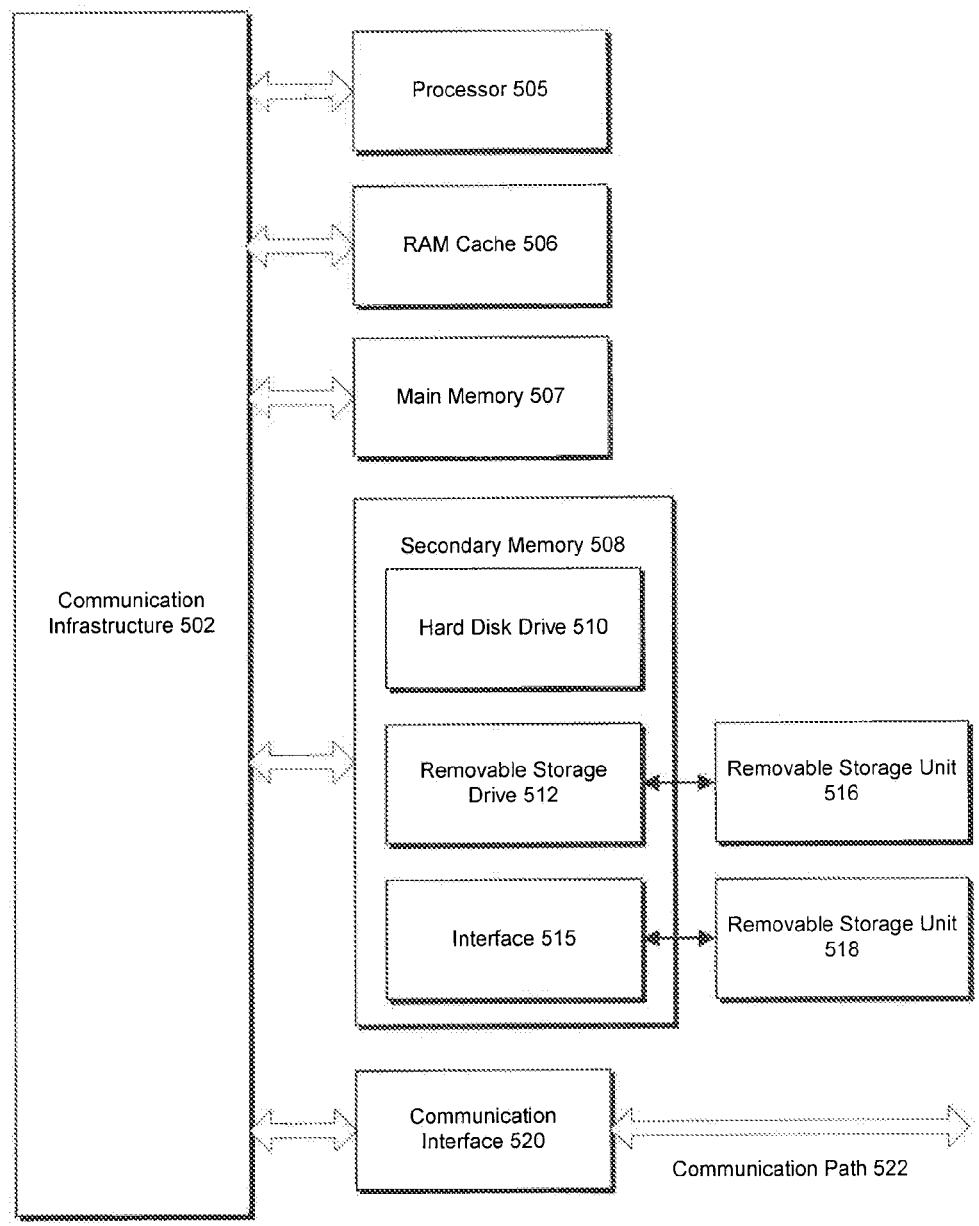
FIG. 5 illustrates a block diagram of an exemplary computer system on which the embodiments can be implemented

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 502 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a RAM cache 506 and a main memory 507 (e.g., random access memory (RAM)), and may also include a secondary memory 508. RAM cache 120 may store copies of data from a plurality of memory locations in main memory 507. RAM cache 506 may be located outside of processor 504. Secondary memory 508 may include one or more of, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 507 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The Summary and Abstract sections may set forth one or more but not all exemplary embodiments as contemplated by the inventor(s), and thus, are not intended to limit the embodiments and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system, comprising:
    a tag buffer, configured to store a plurality of tags, each tag indicating which data blocks are stored in a row of a memory cache;
    a request buffer configured to store a memory request having an associated tag; and
    a memory controller configured to:
        calculate a row index from the memory request;
        compare the associated tag to the plurality of tags stored in the tag buffer if a row identified by the row index is in the tag buffer; and
        issue the memory request stored in the request buffer to either the memory cache or a main memory based on the comparison.

2. The system of claim 1, wherein the memory controller is further configured to:
    update the plurality of tags stored in the one or more rows in the memory cache with the plurality of tags stored in the tag buffer.

3. The system of claim 1, wherein the memory controller is further configured to:
    close a row in the memory cache when the associated tag is not stored in the tag buffer.

4. The system of claim 1, wherein the memory controller is further configured to:
    issue the memory request to the memory cache when the associated tag is stored in the tag buffer.

5. The system of claim 1, wherein the memory controller is further configured to:
    issue the memory request to the main memory when the associated tag is not stored in the tag buffer.

6. The system of claim 1, wherein the memory controller is further configured to:
    store the associated tag in the tag buffer after issuing the memory request.

7. A method, comprising:
    storing a memory request having an associated tag in a request buffer;

calculating a row index from the memory request;
comparing the associated tag to a plurality of tags stored in a tag buffer, wherein each tag indicates which data blocks are stored in a row of a memory cache, if a row identified by the row index is in the tag buffer; and
issuing the memory request to either the memory cache or a main memory based on the comparing.

8. The method recited in claim 7, wherein the issuing of the memory request further comprises:
updating the plurality of tags stored in the one or more rows in the memory cache with the plurality of tags stored in the tag buffer.

9. The method recited in claim 7, wherein the issuing of the memory request further comprises:
closing a row in the memory cache when the associated tag is not stored in the tag buffer.

10. The method recited in claim 7, wherein the issuing of the memory request further comprises:
issuing the memory request to the memory cache when the associated tag is stored in the tag buffer.

11. The method recited in claim 7, wherein the issuing of the memory request further comprises:
issuing the memory request to the main memory when the associated tag is not stored in the tag buffer.

12. The method recited in claim 7, wherein the issuing of the memory request further comprises:
storing the associated tag in the tag buffer after issuing the memory request.

13. A non-transitory computer-readable storage device having computer-executable instructions stored thereon, execution of which, by a computing device, causes the computing device to perform operations comprising:
storing a memory request having an associated tag in a request buffer;
calculating a row index from the memory request;
comparing the associated tag to a plurality of tags stored in a tag buffer, wherein each tag indicates which data blocks are stored in a row of a memory cache, if a row identified by the row index is in the tag buffer; and
issuing the memory request to either the memory cache or a main memory based on the comparing.

14. The non-transitory computer-readable storage device of claim 13, wherein the issuing of the memory request further comprises:
updating a plurality of tags stored in one or more rows in the memory cache with the plurality of tags stored in the tag buffer.

15. The non-transitory computer-readable storage device of claim 13, wherein the issuing of the memory request further comprises:
closing a row in the memory cache when the associated tag is not stored in the tag buffer, wherein the plurality of tags stored in the tag buffer correspond to a plurality of tags stored in one or more rows in the memory cache.

16. The non-transitory computer-readable storage device of claim 13, wherein the issuing of the memory request further comprises:
issuing the memory request to the memory cache when the associated tag is stored in the tag buffer.

17. The non-transitory computer-readable storage device of claim 13, wherein the issuing of the memory request further comprises:
issuing the memory request to the main memory when the associated tag is not stored in the tag buffer.

18. The non-transitory computer-readable storage device of claim 13, wherein the issuing of the memory request further comprises:
storing the associated tag in the tag buffer after issuing the memory request.

* * * * *